US011368379B2

(12) United States Patent
Koutitas

(10) Patent No.: US 11,368,379 B2
(45) Date of Patent: Jun. 21, 2022

(54) AUGMENTED REALITY/VIRTUAL REALITY PLATFORM FOR A NETWORK ANALYZER

(71) Applicant: Texas State University, San Marcos, TX (US)

(72) Inventor: Georgios Koutitas, San Marcos, TX (US)

(73) Assignee: Texas State University, San Marcos, TX (US)

( * ) Notice: Subject to any disclaimer, the term of this patent is extended or adjusted under 35 U.S.C. 154(b) by 144 days.

(21) Appl. No.: 16/967,224

(22) PCT Filed: Feb. 26, 2019

(86) PCT No.: PCT/US2019/019511
§ 371 (c)(1),
(2) Date: Aug. 4, 2020

(87) PCT Pub. No.: WO2019/173079
PCT Pub. Date: Sep. 12, 2019

(65) Prior Publication Data
US 2021/0111972 A1 Apr. 15, 2021

Related U.S. Application Data

(60) Provisional application No. 62/639,058, filed on Mar. 6, 2018.

(51) Int. Cl.
*H04L 43/045* (2022.01)
*G02B 27/01* (2006.01)
(Continued)

(52) U.S. Cl.
CPC ........ *H04L 43/045* (2013.01); *G02B 27/0172* (2013.01); *G06F 3/04815* (2013.01);
(Continued)

(58) Field of Classification Search
CPC ... H04L 43/045; H04L 41/22; G06F 3/04815; G06T 19/006
See application file for complete search history.

(56) References Cited

U.S. PATENT DOCUMENTS 7,257,585 B2     8/2007   Stevenson et al.
8,284,191 B1 * 10/2012   Epstein ..................... H04L 1/20
                                                                             715/757
(Continued)

FOREIGN PATENT DOCUMENTS

WO    WO-2017024058 A1 * 2/2017 ............. H04L 41/12

OTHER PUBLICATIONS

International Search Report for International Application No. PCT/US2019/019511 dated Jul. 1, 2019, pp. 1-4.
(Continued)

*Primary Examiner* — Philip C Lee
(74) *Attorney, Agent, or Firm* — Robert A. Voigt, Jr.; Shackelford, Bowen, McKinley & Norton, LLP

(57) ABSTRACT

A method, system and computer program product for overlaying network data on a physical space and/or network devices. Rules are applied to network data that was captured from a network device. Such rules are used to select which network data from the captured network data is to be visualized by a user. The selected network data is then enhanced with additional information (e.g., geographical location). The speed of the transmission and/or volume of the enhanced network data are adapted according to human brain frame rate and user preferences to generate processed network data. Holograms of the processed network data are created for visualization at an augmented reality (AR)/virtual reality (VR) device. The AR/VR device overlays the holograms on top of the physical space encompassing the network device and/or the network device.

21 Claims, 4 Drawing Sheets

(51) Int. Cl.
　　　*G06F 3/04815*　　(2022.01)
　　　*G06T 19/00*　　　(2011.01)
　　　*H04L 41/22*　　　(2022.01)

(52) U.S. Cl.
　　　CPC ............ *G06T 19/006* (2013.01); *H04L 41/22* (2013.01); *G02B 2027/0174* (2013.01)

(56) References Cited

U.S. PATENT DOCUMENTS

| | | | |
|---|---|---|---|
| 8,627,479 | B2 | 1/2014 | Wittenstein et al. |
| 8,965,460 | B1 | 2/2015 | Rao et al. |
| 2004/0236866 | A1 | 11/2004 | Dugatkin et al. |
| 2007/0033279 | A1* | 2/2007 | Battat .................... H04L 41/22 709/224 |
| 2011/0213664 | A1 | 9/2011 | Osterhout et al. |
| 2013/0117377 | A1 | 5/2013 | Miller |
| 2013/0336547 | A1 | 12/2013 | Komogortsev |
| 2014/0306866 | A1 | 10/2014 | Miller et al. |
| 2016/0026253 | A1 | 1/2016 | Bradski et al. |
| 2016/0127401 | A1 | 5/2016 | Chauhan et al. |
| 2017/0310546 | A1* | 10/2017 | Nair .................... H04L 41/0654 |
| 2017/0351094 | A1 | 12/2017 | Poulos et al. |
| 2018/0048673 | A1 | 2/2018 | Hunt et al. |

OTHER PUBLICATIONS

Written Opinion of the International Searching Authority for International Application No. PCT/US2019/019511 dated Jul. 1, 2019, pp. 1-5.

* cited by examiner

AUGMENTED REALITY/VIRTUAL REALITY PLATFORM FOR A NETWORK ANALYZER

CROSS REFERENCE TO RELATED APPLICATIONS

This application claims priority to U.S. Provisional Patent Application Ser. No. 62/639,058, entitled "Augmented Reality/Virtual Reality Platform for a Network Analyzer," filed Mar. 6, 2018, which is incorporated by reference herein in its entirety.

TECHNICAL FIELD

The present invention relates generally to network analyzers, and more particularly to an augmented reality/virtual reality platform for a network analyzer.

BACKGROUND

Network analyzers are instruments that measure the network parameters of networks. Network analyzers are used to help network designers and administrators to optimize the design of the network, detect system and device issues, improve system performance and monitor the system for security threats. For example, the network analyzer may be used to monitor the network to protect against malicious activity as well as monitor the performance of the components of the network so that the network can be designed for optimum performance. For instance, a network analyzer may be used to measure the amplitude and phase properties of a network.

Currently, network analyzers only provide a two-dimensional view of the critical monitored network data. That is, currently, network analyzers present the monitored data on a two-dimensional screen of a computer device, such as a laptop or desktop computer.

As a result, the understanding and interaction with the presented data is limited.

SUMMARY

In one embodiment of the present invention, a method for overlaying network data on a physical space and/or network devices comprises receiving network data captured from a network device. The method further comprises applying rules to the captured network data to determine network data to be visualized by a user. The method additionally comprises selecting network data in the captured network data to be visualized by the user based on applying the rules. Furthermore, the method comprises enhancing the selected network data with additional information. Additionally, the method comprises adapting speed of transmission and/or volume of the enhanced network data according to human brain frame rate and user preferences to generate processed network data. In addition, the method comprises creating holograms of the processed network data for visualization at an augmented reality/virtual reality device, where the augmented reality/virtual reality device overlays the holograms on top of the physical space encompassing the network device and/or the network device.

Other forms of the embodiment of the method described above are in a system and in a computer program product.

In another embodiment of the present invention, a method for executing commands on a network device using holograms comprises receiving a command to be performed on a network device from an augmented reality/virtual reality device, where the augmented reality/virtual reality device identifies a gesture performed by a user in a hologram and translates the identified gesture into the command, and where the hologram overlays a physical space encompassing the network device and/or the network device. The method further comprises receiving an identifier of the hologram from the augmented reality/virtual reality device. The method additionally comprises identifying the network device associated with the hologram using the identifier of the hologram. Furthermore, the method comprises issuing the command to the identified network device to be executed by the identified network device.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
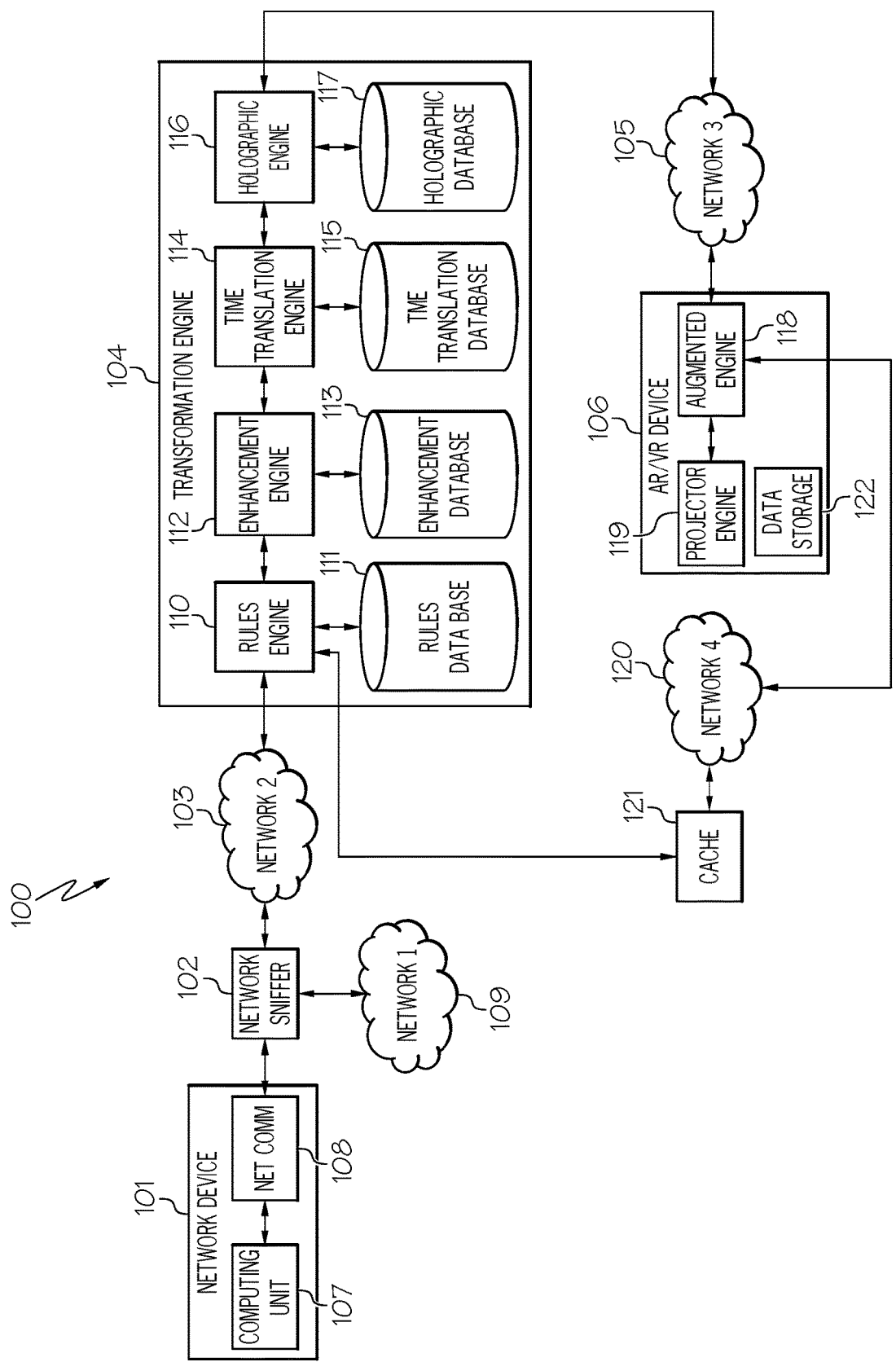
FIG. 1 illustrates an embodiment of the AR/VR network analyzer system in accordance with an embodiment of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with utilizing an augmented reality/virtual reality platform for network analyzers, the principles of the present invention may utilize other types of reality platforms, such as a mixed reality platform. A person of ordinary skill in the art would be capable of applying the principles of the present invention to such implementations. Further, embodiments applying the principles of the present invention to such implementations would fall within the scope of the present invention.

The present invention presents network information to users leveraging augmented reality/virtual reality technology to allow users of network analyzers to visualize the data in the context of the physical network they are managing, such as via a hologram. Using an augmented reality/virtual reality device, network administrators can see data in real-time, overlaid onto network devices, adding richer content and deeper understanding by enhancing situational awareness. Additionally, the present invention uses a fourth ($4^{th}$) dimension of time thereby allowing the user to visualize, replay, and interact with the time sequence of network packets and data transmission. Data presented in this way would improve security threat detection as well as improve understanding of overall network health and assist in network management.

The present invention creates a state-of-the-art technology that integrates networking equipment with augment reality/virtual reality ("AR/VR") software to create a "four-dimensional" ("4D") experience of interacting with the network in the close vicinity of the user, using a "man-in-the-loop" concept. The 4D experience will provide real-time spatiotemporal visualization and allow the user to participate and interact with the network in a highly intuitive fashion. The three-dimensional ("3D") spatial characteristic will enable the user to distinguish directional packets, flows, and transmissions between network-resident devices, such as routers and switches. The additional $4^{th}$ dimension (time) will enable the user to visualize, store/replay, and interact directly with the time sequence of packets, flows, transmissions, and other network contexts.

In one embodiment, the present invention overlays the network related data on top of the network devices (e.g., servers, switches, routers, modems, etc.) in the physical world, such as via holograms. In one embodiment, the network data (e.g., sensor data, protocol used for transmission (e.g., Zigbee, TCP/IP, HTTP, etc.), packet format, frame structure) may be user-specific. For example, the user of the system selects the type of data to be visualized as holograms on top of the network devices. In certain instances, the application of the system of the present invention can be considered as a "network-based situational awareness" application directed at threat management.

In one embodiment, the system of the present invention includes a network sniffer engine that is responsible for capturing network related data from the network devices. The system of the present invention may also include a rules engine that is responsible for applying various rules, which may be defined and stored by the user in a rules database, on the captured network data.

In one embodiment, the system of the present invention also includes an enhancement engine that is responsible to integrate data from external databases and/or systems or to insert identifiers to the data for better hologram to data association. For example, the Internet Protocol (IP) address of network data will be correlated to its physical geographical coordinates of the server.

In one embodiment, the system of the present invention also includes a time translation engine that is responsible for modifying and adapting the high speed of network data transfer to human centric frame rates that can be processed by the brain. For example, a typical human brain is able to visualize and understand up to 120 frames per second. The time translation engine is also capable of performing store/replay of data and allowing an interaction directly with the time sequence of packets, flows, transmissions, and other network contexts.

Furthermore, in one embodiment, the system of the present invention also includes a holographic engine that is responsible to convert the raw data into holograms.

Additionally, in one embodiment, the system of the present invention includes an augmented engine that is responsible for performing the spatial mapping and overlaying the holograms on the physical space. In one embodiment, such functionality is performed by the use of commodity AR/VR devices.

Referring now to the Figures in detail, FIG. 1 illustrates an embodiment of the augmented reality/virtual reality ("AR/VR") network analyzer system 100 in accordance with an embodiment of the present invention. As shown in FIG. 1, system 100 includes a network device 101, a network sniffer 102, a communication network 103 (identified as "Network 2" in FIG. 1), a transformation engine 104, a communication network 105 (identified as "Network 3" in FIG. 1) and an AR/VR Device 106. Network device 101 is communicatively connected with network sniffer 102; network sniffer 102 is communicatively connected with transformation engine 104; transformation engine 104 is communicatively connected with AR/VR device 106.

In one embodiment, network device 101 includes a computing unit 107 which is connected to a network communication module 108 (identified as "net comm" in FIG. 1) that sends and/or receives network data from various networks. For example, network communication module 108 may send data to an external system though "Network 1" 109 and/or to the proposed system through network 2 103. Furthermore, network communication module 108 is communicatively connected with network sniffer 102.

In one embodiment, network sniffer 102 is a software layer that can operate within device 101. An example of network sniffer 102 is the TCP-Dump software in Linux®. In one embodiment, network sniffer 102 captures the network related data that is generated by network device 101. Examples of network data include sensor readings (e.g., temperature, energy, humidity, location, health data, accelerometer, etc.), protocols (e.g., transmission control protocol (TCP), user datagram protocol (UDP), Internet protocol (IP), hypertext markup language (HTML), hypertext transport protocol (HTTP), etc.), network processes (e.g., ping, traceroute, acknowledgement, network topology, routing table, etc.), packets (e.g., frame, payload, header, etc.), etc.

In one embodiment, network sniffer 102 is responsible for capturing the required network data and sending the captured network data to transformation engine 104 for further processing. The data transmission can be done with a different or the same network (e.g., in the case of being the same network, network 109 and network 103 are the same network) that is used by network device 101 to send and receive data from third parties.

In one embodiment, transformation engine 104 includes a rules engine 110 connected to a rules database 111, an enhancement engine 112 connected to an enhancement database 113, a time translation engine 114 connected to a time translation database 115 and a holographic engine 116 connected to a holographic database 117. These elements are communicatively connected to each other as shown in FIG. 1.

In one embodiment, the network data captured by network sniffer 102 is sent to transformation engine 104 for processing and transformation. Transformation engine 104 is responsible for transforming the raw network data into holograms that are realistically overlaid on the physical space and/or the network devices (e.g., network device 101). Transformation engine 104 provides real-time spatio-temporal visualization and allows the user to participate and interact with the network in a highly intuitive fashion.

In one embodiment, the network data from network sniffer 102 is received by rules engine 110. Rules engine 110 processes the network data to identify the preferences of the user of the system from rules database 111. For example, a user may only be willing to observe the temperature reading from a sensor. Other users, however, may be willing to visualize the network topology or the routing table of the communication network; whereas, other users may want to visualize the packet structure or angle of arrival of the packets in three-dimensional (3D) space. In one embodiment, the rules applied by rules engine 110 are user-selected.

In one embodiment, the network data that is filtered by rules engine 110 is fed to enhancement engine 112. Enhancement engine 112 communicates with a database 113 or a third party (not shown) and is responsible to enhance additional information to the network data or to insert identifiers to the data for better hologram to data association. For example, a user may be willing to see the direction of arrival of packets from different servers. In that case, enhancement engine 112 will communicate with third parties or database 113 to convert the IP address of the server to a geographical location and coordinate value. In the overall experience of the user, the system will overlay hologram packets coming from the relevant directions. The output of enhancement engine 112 is network data from the output of rules engine 110 as well as enhanced data from the processing of enhancement engine 112. These data are entered into time translation engine 114.

In one embodiment, enhancement engine 112 stores a table, such as a data structure within enhancement database 113, that includes a mapping of the holograms to the network devices encompassed by the holograms, including the geographic locations of the network devices within the hologram if there are multiple network devices overlaid by the hologram.

In one embodiment, time translation engine 114 communicates with time translation database 115 and is responsible for adapting the high speed and volume of packet transmission of the network data according to human brain frame rate and user preferences. For example, a packet rate of the order of kilo packet per second or mega packet per second cannot be conceived by the human brain. Thus, a time translation between the computer speed of communication with human based criteria needs to take place. Time translation engine 114 provides the additional 4th dimension (time) that enables the user to store/replay, and interact directly with the time sequence of packets, flows, transmissions, and other network contexts. Time translation engine 114 communicates with time translation database 115 that holds user centric criteria for the time translation. For example, a user may be willing to see the direction of packet reception every 10 seconds but the sensor reading every 1 second.

In one embodiment, holographic engine 116 receives the processed data from time translation engine 114 and creates the holograms of the selected network data for visualization at AR/VR device 106. Holographic engine 116 is connected to a holographic database 117 that provides a selection of holograms, such as lines, graphics, numbers, etc. Holographic engine 116 also adapts the format of the holograph to meet the needs of AR/VR device 106.

In one embodiment, each hologram generated by holographic engine 116 is assigned an identifier that is passed to AR/VR device 106. In one embodiment, such identifiers are stored in a table (e.g., table within holographic database 117) that maps each identifier to a designated hologram.

In one embodiment, AR/VR device 106 is connected to holographic engine 116 and receives the holographs though communication network 105. AR/VR device 106 includes an augmented engine 118 and a projector engine 119. Augmented engine 118 is configured to receive the hologram from transformation engine 104 and perform the spatial mapping for the overlay of the holograms to the physical space. Augmented engine 118 may also send data for object detection to an external database and/or parties using different networks, such as network 120 (identified as "Network 4" in FIG. 1). In some occasions, in order to reduce overall latency, a caching server ("cache") 121 may be used to minimize the costs of the object detection process.

In one embodiment, projector engine 119 is configured to project the holograms in the vicinity of the user.

In one embodiment, AR/VR device 106 is configured to identify a gesture made by a user to a projected hologram and to translate the identified gesture into a command. For example, a user may desire to block the reception of network packets from a network device. As a result, the user may move his/her hand in a "cut" motion or gesture to the hologram encompassing the network device. In one embodiment, AR/VR device 106 stores a table mapping the detected motions to particular commands. In one embodiment, such a table is a data structure that is stored in a data storage device 122 (e.g., memory, disk unit) of AR/VR device 106.

System 100 is not to be limited in scope to any one particular architecture. System 100 may include any number of network devices 101, network sniffers 102, networks 103, 105, 109, 120, transformation engines 104, AR/VR devices 106 and caches 121. Furthermore, system 100 may include fewer devices than depicted, such as utilizing only a single network. Furthermore, while FIG. 1 illustrates transformation engine 104 as being a separate device, some or all of the functionality of transformation engine 104, as discussed herein, may reside in network device 101 and/or AR/VR device 106.

In one embodiment, transformation engine 104 may be implemented as software components (e.g., application 204 of computing device 200 as discussed further below) executed by a processor of a computing device, including network device 101 and/or AR/VR device 106. A description of an embodiment of the hardware configuration of such a computing device is provided below in connection with FIG. 2.

Figure 2:
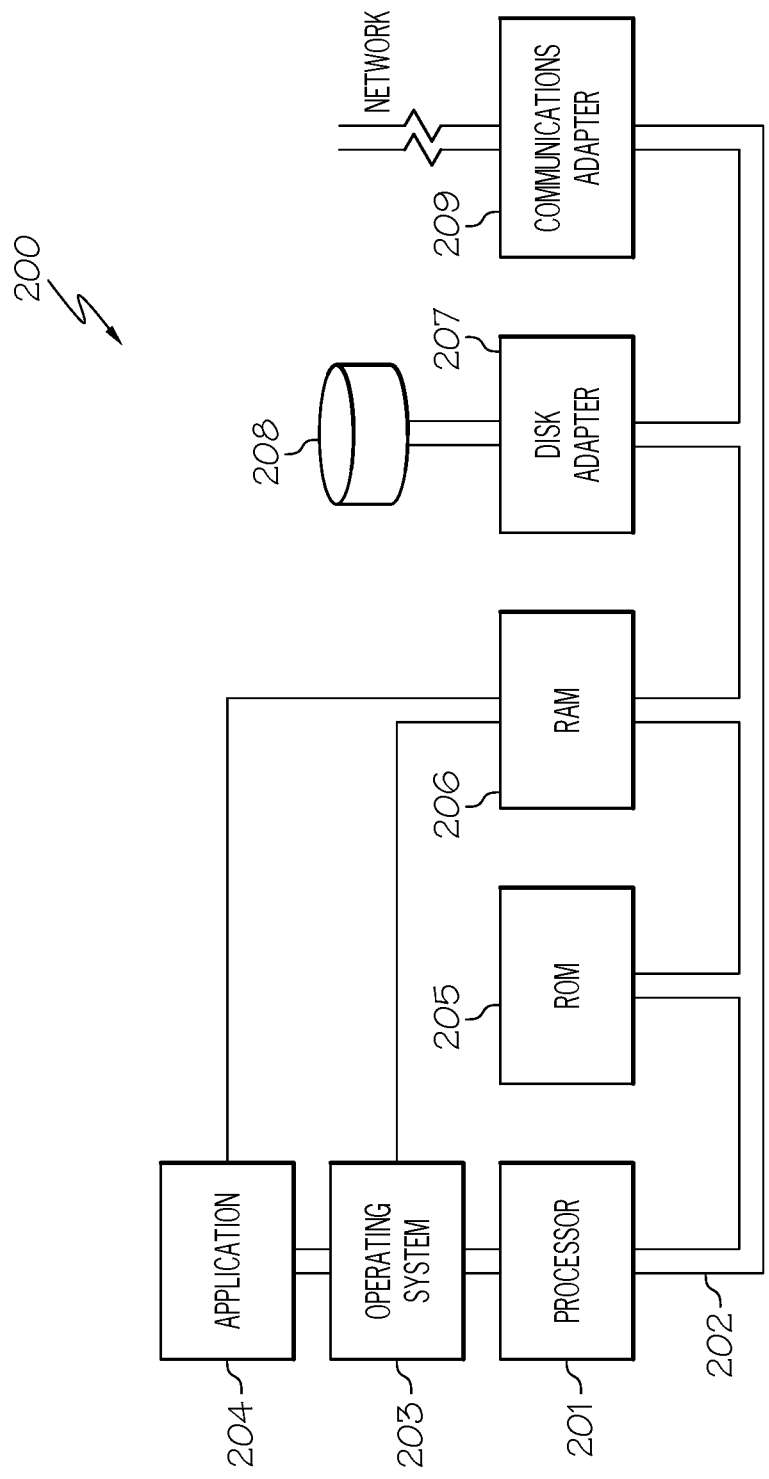
FIG. 2 illustrates a hardware configuration of a computing device which is representative of a hardware environment for practicing the present invention.

Referring now to FIG. 2, FIG. 2 illustrates a hardware configuration of computing device 200 which is representative of a hardware environment for practicing the present invention. Referring to FIG. 2, computing device 200 has a processor 201 connected to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for overlaying network data on top of a physical space and/or network devices (e.g., servers, switches, routers, modems, etc.) in the physical world, such as via holograms, as discussed further below in connection with FIG. 3. Furthermore, application 204 may include a program for executing commands on network devices by the user interacting with the holograms overlaying the network devise and/or the physical space encompassing the network devices as discussed further below in connection with FIG. 4.

Referring again to FIG. 2, read-only memory ("ROM") 205 is connected to system bus 202 and includes a basic input/output system ("BIOS") that controls certain basic functions of computing device 200. Random access memory ("RAM") 206 and disk adapter 207 are also connected to system bus 202. It should be noted that software components including operating system 203 and application 204 may be loaded into RAM 206, which may be computing device's 200 main memory for execution. Disk adapter 207 may be an integrated drive electronics ("IDE") adapter that communicates with a disk unit 208, e.g., disk drive.

Computing device 200 may further include a communications adapter 209 connected to bus 202. Communications adapter 209 interconnects bus 202 with an outside network thereby enabling computing device 200 to communicate with other devices.

Computing device 200 of FIG. 2 is not to be limited in scope to the elements depicted in FIG. 2 and may include fewer or additional elements than depicted in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, network analyzers only provide a two-dimensional view of the critical monitored network data. That is, currently, network analyzers present the monitored data on a two-dimensional screen of a computer device, such as a laptop or desktop computer. As a result, the understanding and interaction with the presented data is limited.

The principles of the present invention improve the understanding and interaction with the presented data by providing a three-dimensional or a four-dimensional view, such as by overlaying the network data on top of a physical space and/or the network devices (e.g., servers, switches, routers, modems, etc.) in the physical world, such as via holograms, as discussed below in connection with FIG. 3.

Figure 3:
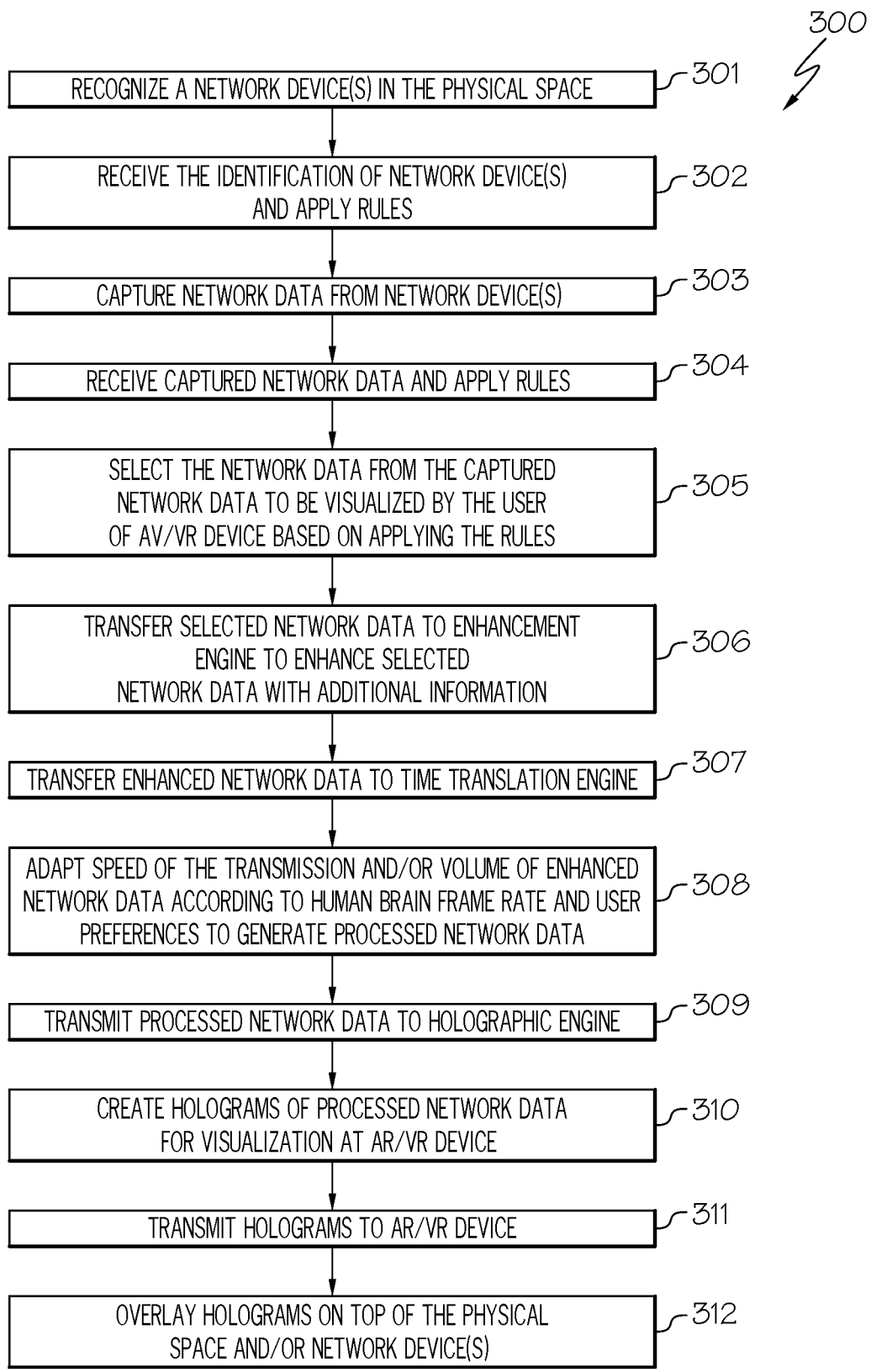
FIG. 3 is a flowchart of a method for overlaying network data on top of a physical space and/or network devices in accordance with an embodiment of the present invention.

FIG. 3 is a flowchart of a method 300 for overlaying network data on top of a physical space and/or network devices (e.g., network device 101 of FIG. 1) in accordance with an embodiment of the present invention.

Referring to FIG. 3, in conjunction with FIGS. 1-2, in step 301, AR/VR device 106 recognizes a network device(s), such as network device 101, in the physical space. For example, a user that wears AR/VR device 106 is looking towards a network device(s), such as network device 101, which may be one of the network devices of a datacenter. In one embodiment, AR/VR device 106 (augmented engine 118) scans the physical space and recognizes network device(s) 101.

In step 302, transformation engine 104, and more precisely, rules engine 110, receives the identification of network device(s) 101 from AR/VR device 106 and rules are applied by rules engine 110. As previously discussed, such rules are used to determine which network data, such as which network data from the captured network data as discussed below, is to be visualized by the user of AR/VR device 106, such as TCP/IP packets. For example, the rules may be applied to the identified network device, which indicate that for the identified network device (e.g., server), the user would like to view TCP/IP packets.

In step 303, network sniffer 102 captures network critical data from the identified network device(s) 101. For example, network sniffer 102 may capture the TCP/IP packets transmitted and received as well as the IP addresses.

In step 304, transformation engine 104 receives the captured network data from network sniffer 102 and rules are applied by rules engine 110 to determine the network data to be visualized by the user of AR/VR device 106. For example, suppose that the user has selected to visualize holograms of the packets and their angle of arrival in a three-dimensional space based on geographical coordinates. Thus, rules engine 110 selects to capture the TCP/IP packets of transmission and reception and their IP address.

In step 305, transformation engine 104 selects the network data from the captured network data to be visualized by the user of AR/VR device 106 based on applying the rules by rules engine 110.

In step 306, the data selected by rules engine 110 is transferred to enhancement engine 112 to enhance the selected network data with additional information (e.g., a geographical location, a name of a server vendor, an Internet service provider, identifiers for data to hologram association). For example, as discussed above, enhancement engine 112 may communicate with a third party or database 113 to convert the IP address to real geographical coordinates.

In step 307, enhancement engine 112 transfers the enhanced network data to time translation engine 114.

In step 308, time translation engine 114 adapts the speed of the transmission and/or volume of the enhanced network data according to human brain frame rate and user preferences to generate processed network data.

In step 309, time translation engine 114 transmits the processed network data to holographic engine 116.

In step 310, holographic engine 116 creates the holograms of the processed network data for visualization at AR/VR device 106. In one embodiment, holographic engine 116 provides a selection of holograms, such as lines, graphics, numbers, etc. Holographic engine 116 also adapts the format of the holograph to meet the needs of AR/VR device 106. For example, holographic engine 116 creates holograms to represent the packet information and enable the real visualization in the physical space.

In step 311, holographic engine 116 transmits the holograms to AR/VR device 106, which are received by AR/VR device 106.

In step 312, AR/VR devices 106 overlays the holograms on top of the physical space encompassing the network device(s) and/or the network device(s).

With this system, the user has created a four-dimensional ("4D") experience and a new way to interact with networks and networking devices. The user can more easily identify threats or understand network processes because all data is overlaid on the physical space that the user can better understand compared to just monitoring a screen.

Upon overlaying the holograms on top of the physical space encompassing the network device(s) and/or the network device(s), a user may interact with the holograms to execute commands on the appropriate network device(s) as discussed below in connection with FIG. 4.

Figure 4:
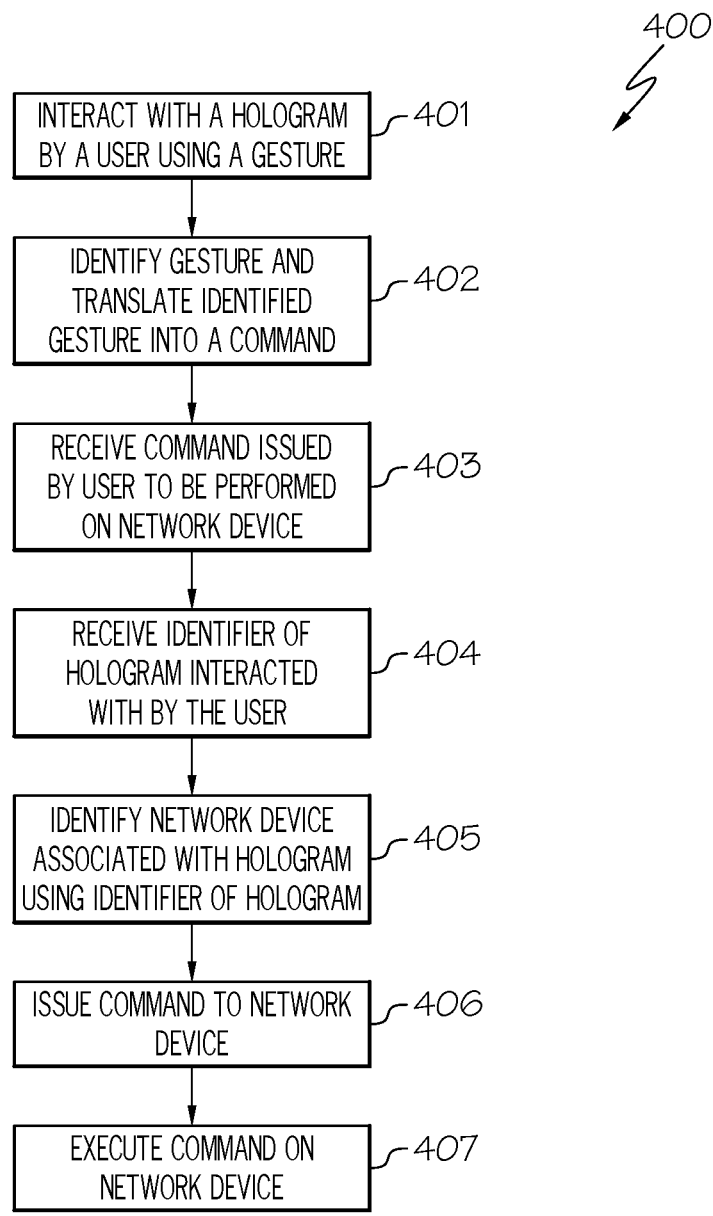
FIG. 4 is a flowchart of a method for executing commands on network devices by interacting with the holograms overlaying the network devices and/or the physical space encompassing the network devices in accordance with an embodiment of the present invention.

FIG. 4 is a flowchart of a method 400 for executing commands on network devices (e.g., network device 101) by interacting with the holograms overlaying the network devices and/or the physical space encompassing the network devices in accordance with an embodiment of the present invention.

Referring to FIG. 4, in conjunction with FIGS. 1-3, in step 401, a user interacts with a hologram overlaying the physical space encompassing the network device(s) and/or the network device(s), such as via a gesture (e.g., a movement of a hand to express an idea or meaning).

In step 402, AR/VR device 106 identifies the gesture performed by the user of AR/VR device 106 in the hologram and translates the identified gesture into a command. For example, a user may desire to block the reception of network packets from a network device. As a result, the user may move his/her hand in a "cut" motion or gesture to the hologram encompassing the network device. In one embodiment, AR/VR device 106 stores a table mapping detected motions to particular commands. In one embodiment, such a table is a data structure that is stored in a data storage device 122 of AR/VR device 106.

In step 403, transformation engine 104 receives the command issued by the user to be performed on the network device that is encompassed by the designated hologram from AR/VR device 106.

In step 404, transformation engine 104 receives an identifier of the hologram interacted with by the user from AR/VR device 106. In one embodiment, each hologram generated by holographic engine 116 is assigned an identifier that is passed to AR/VR device 106. Hence, when AR/VR device 106 sends the command to transformation engine 104 to be performed on the network device, AR/VR device 106 sends the identifier of the hologram that encompasses that network device.

In step 405, transformation engine 104 (enhancement engine 112) identifies the network device associated with the hologram (the hologram in which the user made a gesture) using the identifier of the hologram. In one embodiment, enhancement engine 112 stores a table, such as a data structure, that includes a mapping of the holograms to the network devices encompassed by the holograms, including the geographic locations of the network devices within the hologram if there are multiple network devices overlaid by the hologram. In such a scenario, transformation engine 104 may also receive the geographic location of the gesture thereby pinpointing the particular network device within the hologram that contains multiple network devices.

In step 406, transformation engine 104 issues the command to the network device (e.g., network device 101). In one embodiment, the command issued by transformation engine 104 takes into consideration the network data selected to be visualized by the user of AR/VR device 106. For example, the issued command may be to block the reception of a particular type of network packet that was selected to be visualized by the user of AR/VR device 106.

In step 407, the network device (e.g., network device 101) executes the command.

The present invention improves the technology or technical field involving network analyzers. As discussed above, network analyzers are instruments that measure the network parameters of networks. Network analyzers are used to help network designers and administrators to optimize the design of the network, detect system and device issues, improve system performance and monitor the system for security threats. For example, the network analyzer may be used to monitor the network to protect against malicious activity as well as monitor the performance of the components of the network so that the network can be designed for optimum performance. For instance, a network analyzer may be used to measure the amplitude and phase properties of a network. Currently, network analyzers only provide a two-dimensional view of the critical monitored network data. That is, currently, network analyzers present the monitored data on a two-dimensional screen of a computer device, such as a laptop or desktop computer. As a result, the understanding and interaction with the presented data is limited.

The present invention improves such technology by improving the understanding and interaction with the presented data by providing a three-dimensional or a four-dimensional view, such as by overlaying the network data on top of a physical space and/or the network devices (e.g., servers, switches, routers, modems, etc.) in the physical world, such as via holograms. For instance, embodiments of the present invention may create a four-dimensional ("4D") experience and a new way to interact with networks and networking devices. The user can more easily identify threats or understand network processes because all data is overlaid on the physical space that the user can better understand compared to just monitoring a screen. Additionally, in one embodiment, upon overlaying the holograms on top of the network devices(s) and/or the physical space encompassing the network device(s), a user may interact with the holograms to execute commands on the appropriate network device(s).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for overlaying network data on a physical space and/or network devices, the method comprising:
   receiving network data captured from a network device;
   applying rules to said captured network data to determine network data to be visualized by a user;
   selecting network data in said captured network data to be visualized by said user based on applying said rules;
   enhancing said selected network data with additional information;
   adapting speed of transmission and/or volume of said enhanced network data according to human brain frame rate and user preferences to generate processed network data; and
   creating holograms of said processed network data for visualization at an augmented reality/virtual reality device, wherein said augmented reality/virtual reality device overlays said holograms on top of said physical space encompassing said network device and/or said network device.

2. The method as recited in claim 1 further comprising:
   receiving an identification of said network device; and
   applying said rules to said identified network device to determine which network data to be visualized by said user.

3. The method as recited in claim 1, wherein said rules are user-selected.

4. The method as recited in claim 1 further comprising:
   communicating with a database or a third party to obtain said additional information.

5. The method as recited in claim 4, wherein said additional information comprises one or more of the following: a geographical location, a name of a server vendor, an Internet service provider, identifiers for data to hologram association.

6. The method as recited in claim 1, wherein said holograms are overlaid on top of said physical space encompassing said network device and/or said network device in three-dimensional or four-dimensional space.

7. The method as recited in claim 1, wherein said network device comprises one of the following: a server, a switch, a router and a modem.

8. A computer program product for overlaying network data on a physical space and/or network devices, the computer program product comprising a computer readable storage medium having program code embodied therewith, the program code comprising the programming instructions for:

receiving network data captured from a network device;

applying rules to said captured network data to determine network data to be visualized by a user;

selecting network data in said captured network data to be visualized by said user based on applying said rules;

enhancing said selected network data with additional information;

adapting speed of transmission and/or volume of said enhanced network data according to human brain frame rate and user preferences to generate processed network data; and creating holograms of said processed network data for visualization at an augmented reality/virtual reality device, wherein said augmented reality/virtual reality device overlays said holograms on top of said physical space encompassing said network device and/or said network device.

9. The computer program product as recited in claim 8, wherein the program code further comprises the programming instructions for:

receiving an identification of said network device; and applying said rules to said identified network device to determine which network data to be visualized by said user.

10. The computer program product as recited in claim 8, wherein said rules are user-selected.

11. The computer program product as recited in claim 8, wherein the program code further comprises the programming instructions for:

communicating with a database or a third party to obtain said additional information.

12. The computer program product as recited in claim 11, wherein said additional information comprises one or more of the following: a geographical location, a name of a server vendor, an Internet service provider, identifiers for data to hologram association.

13. The computer program product as recited in claim 8, wherein said holograms are overlaid on top of said physical space encompassing said network device and/or said network device in three-dimensional or four-dimensional space.

14. The computer program product as recited in claim 8, wherein said network device comprises one of the following: a server, a switch, a router and a modem.

15. A system, comprising:

a memory for storing a computer program for overlaying network data on a physical space and/or network devices; and a processor connected to said memory, wherein said processor is configured to execute the program instructions of the computer program comprising:

receiving network data captured from a network device;

applying rules to said captured network data to determine network data to be visualized by a user;

selecting network data in said captured network data to be visualized by said user based on applying said rules;

enhancing said selected network data with additional information;

adapting speed of transmission and/or volume of said enhanced network data according to human brain frame rate and user preferences to generate processed network data; and creating holograms of said processed network data for visualization at an augmented reality/virtual reality device, wherein said augmented reality/virtual reality device overlays said holograms on top of said physical space encompassing said network device and/or said network device.

16. The system as recited in claim 15, wherein the program instructions of the computer program further comprise:

receiving an identification of said network device; and applying said rules to said identified network device to determine which network data to be visualized by said user.

17. The system as recited in claim 15, wherein said rules are user-selected.

18. The system as recited in claim 15, wherein the program instructions of the computer program further comprise:

communicating with a database or a third party to obtain said additional information.

19. The system as recited in claim 18, wherein said additional information comprises one or more of the following: a geographical location, a name of a server vendor, an Internet service provider, identifiers for data to hologram association.

20. The system as recited in claim 15, wherein said holograms are overlaid on top of said physical space encompassing said network device and/or said network device in three-dimensional or four-dimensional space.

21. The system as recited in claim 15, wherein said network device comprises one of the following: a server, a switch, a router and a modem.

* * * * *